US006938475B2

(12) United States Patent
Lopatin

(10) Patent No.: US 6,938,475 B2
(45) Date of Patent: Sep. 6, 2005

(54) DEVICE FOR ESTABLISHING AND/OR MONITORING A PREDETERMINED FILL LEVEL IN A CONTAINER

(75) Inventor: Sergej Lopatin, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/472,197

(22) PCT Filed: Mar. 16, 2002

(86) PCT No.: PCT/EP02/02957

§ 371 (c)(1), (2), (4) Date: Sep. 29, 2003

(87) PCT Pub. No.: WO02/079733

PCT Pub. Date: Oct. 10, 2002

(65) Prior Publication Data

US 2004/0093941 A1 May 20, 2004

(30) Foreign Application Priority Data

Mar. 28, 2001 (DE) ........................................ 101 15 558
Nov. 6, 2001 (DE) ........................................ 101 53 936

(51) Int. Cl.[7] ................................................ G01S 13/08
(52) U.S. Cl. ...................... 73/290 V; 367/908; 342/124
(58) Field of Search ............................ 73/290 V, 32 A; 340/612; 367/908; 342/124

(56) References Cited

U.S. PATENT DOCUMENTS 3,145,559 A 8/1964 Banks
3,575,130 A 4/1971 Altmann
4,594,584 A * 6/1986 Pfeiffer et al. .............. 340/620
5,191,316 A * 3/1993 Dreyer ....................... 340/621
5,408,168 A * 4/1995 Pfandler ................... 73/290 V
5,631,633 A * 5/1997 Dreyer et al. ............... 340/621
5,644,299 A * 7/1997 Cruickshank ............... 340/617
5,895,848 A 4/1999 Wilson et al.
5,943,294 A 8/1999 Cherek ........................ 367/98
6,389,891 B1 * 5/2002 D'Angelico et al. ...... 73/290 V
6,606,904 B2 * 8/2003 Muller et al. ............. 73/290 V

FOREIGN PATENT DOCUMENTS

| | | |
|---|---|---|
| DE | 3348119 | 2/1985 |
| DE | 4118793 | 12/1992 |
| DE | 44 19 617 A1 | 12/1995 |
| DE | 19720519 | 11/1998 |
| WO | WO95/29388 | 2/1995 |

* cited by examiner

*Primary Examiner*—Hezron Williams
*Assistant Examiner*—Tamiko Bellamy
(74) *Attorney, Agent, or Firm*—Bacon & Thomas

(57) ABSTRACT

A device for establishing and/or monitoring a predetermined fill level in a container is provided, which also operates stably in liquids with surface waves, which includes: a mechanical oscillatory structure placed at the height of the predetermined fill level, an electromechanical transducer, which in operation excites the oscillatory structure to resonance oscillations, and a receiver- and evaluation-unit, which serves for determining from the resonance oscillation whether the predetermined fill level has been reached, or not, in which a shape of the oscillatory structure is so constructed that the resonance frequency changes only slowly with immersion depth in the case of immersion in the region of the predetermined fill level.

3 Claims, 3 Drawing Sheets

DEVICE FOR ESTABLISHING AND/OR MONITORING A PREDETERMINED FILL LEVEL IN A CONTAINER

TECHNICAL FIELD

The invention relates to a device for establishing and/or monitoring a predetermined fill level in a container.

BACKGROUND OF THE INVENTION

Fill level limit switches of this type are applied in many branches of industry, especially in the chemical and food industries. They serve for detecting a limit level and are e.g. used as overfill guards or protection against pumps running empty.

DE-A 44 19 617 describes a device for establishing and/or monitoring a predetermined fill level in a container. The device includes: a mechanical oscillatory structure placed at the height of the predetermined fill level, an electromechanical transducer, which in operation excites the oscillatory structure to oscillate with resonance oscillations, and a receiver- and evaluation-unit, which uses a resonance frequency of the resonance oscillation to determine whether the predetermined fill level has been reached, or not.

The electromechanical transducer has at least one transmitter, at which an electrical transmitted signal is applied and which excites the mechanical oscillatory structure to oscillate. A receiver is provided, which picks up the mechanical oscillations of the oscillatory structure and transforms such into an electrical received signal. The evaluation unit obtains the received signal and compares its frequency with a reference frequency. It produces an output signal, which indicates that the mechanical oscillatory structure is covered by a fill material, if the frequency has a value smaller than a reference frequency, and that it is not covered, if the value is larger. A control circuit is provided, which regulates a phase difference between the electrical transmitted signal and the electrical received signal to a determined, constant value, at which the oscillatory structure executes oscillations with a resonance frequency.

The control circuit is e.g. formed such that the received signal is amplified and fed back to the transmitted signal by way of a phase shifter.

The oscillatory structures often utilize a membrane, on which is arranged at least one oscillation bar protruding into the container. In operation, the oscillation bars are caused to oscillate with resonance oscillations perpendicular to their longitudinal axes. In order that as large a change as possible will occur in the oscillation frequency upon immersion of the oscillatory structure into the liquid, the oscillation bars are constructed to have paddle-shapes on their ends.

When such a device is placed in a container, in which a liquid is present with waves on its surface caused e.g. by a filling process, it can happen that the reference frequency will repeatedly be first exceeded and then gone under, because of the wave motion. The device then is no longer stable upon attainment of the predetermined fill level, but, instead, changes its switch state in short intervals, without the fill level actually making any net change.

This problem is especially noticeable, when the device is installed in a container from below. In such case, when the fill level rises starting from the container floor, the predetermined frequency change at which the device changes its state lies very much closer to the free end of the oscillation bar than when the oscillation bars extend into the container from above. At the free end of the oscillation bar, the resonance frequency of conventional paddle shapes changes very much more rapidly than e.g. in a middle region of the paddle. As a result, small fill level changes in this case cause large frequency changes. This makes the danger of single or frequent switch state changes being triggered by surface waves especially large.

This can be problematic, if the device is part of a large plant, and the fill level information is being used for regulation or control of other units in the plant.

SUMMARY OF THE INVENTION

It is an object of the invention to provide a device for establishing and/or monitoring a predetermined fill level in a container, which device will function stably even in liquids with surface waves.

The object is solved, according to the invention, by a device for establishing and/or monitoring a predetermined fill level in a container, which device includes: a mechanical oscillatory structure placed at the height of the predetermined fill level, an electromechanical transducer, which in operation excites the oscillatory structure to oscillate with resonance oscillations, and a receiver- and evaluation-unit, which uses a resonance frequency of the resonance oscillation to determine whether the predetermined fill level has been reached, or not, in which a shape of the oscillatory structure is so constructed that the resonance frequency changes only slowly with immersion depth in the case of immersion in the region of the predetermined fill level.

According to a further development the oscillatory structure has at least one membrane-mounted oscillation bar (7), which in operation executes resonance oscillations perpendicular to its longitudinal axis (L), on which a paddle (8) is terminally formed, and wherein a projected surface of separate paddle sections of equal length, moved in operation through the fill material, is maximum in a middle section of the paddle (8) and decreases in the direction toward the free end of the paddle (8).

According to a further development, the oscillatory structure has at least one membrane-mounted oscillation bar, which in operation executes resonance oscillations perpendicular to its longitudinal axis, and on which a paddle (8) is terminally formed, which has a membrane-far end region, whose width decreases in the membrane-far direction.

According to a further development, the paddle is slanted in the end region at an angle between 20° and 55° to the longitudinal axis of the paddle.

According to a further development, the paddle terminates with a point.

According to one embodiment, a hysteresis stage is provided, which is formed such that the device determines the reaching of the predetermined fill level when a lower reference frequency value is gone under and it retains this state until an upper reference frequency value is reached or exceeded.

The invention and additional advantages are explained in more detail on the basis of the figures of the drawing, where four examples of embodiments are presented; equal elements are given the same reference symbols in the figures.

DETAILED DESCRIPTION

Figure 1:
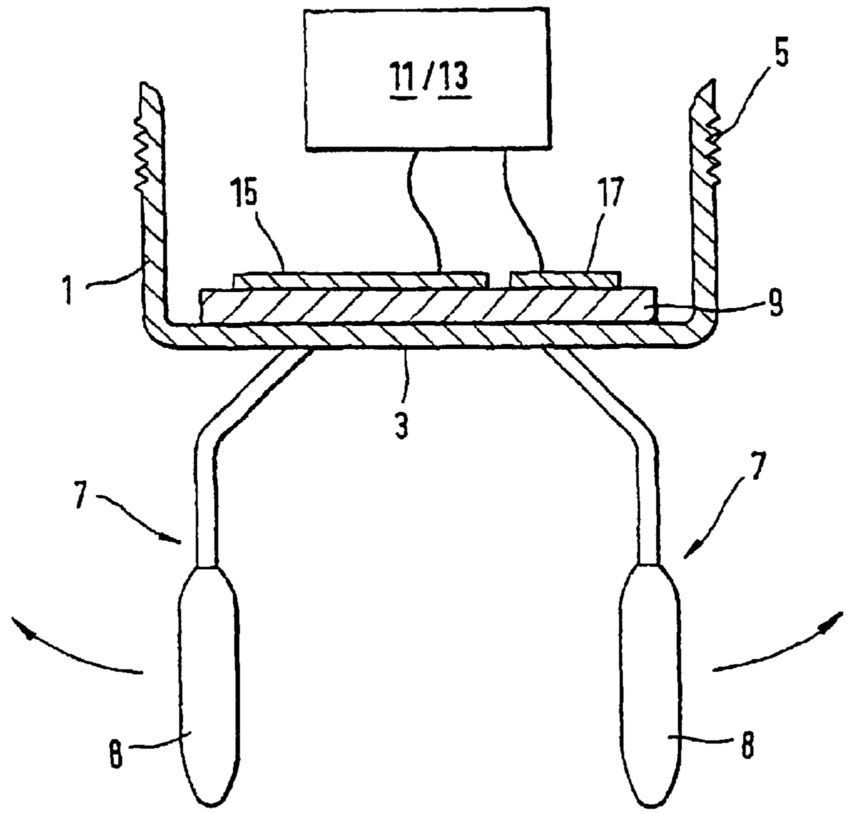
FIG. 1 shows a longitudinal cross section through a device for establishing and/or monitoring a predetermined fill level.

FIG. 1 shows a longitudinal cross section through a device of the invention for establishing and/or monitoring a predetermined fill level in a container. The device has a mechanical oscillatory structure for placement at the height of the predetermined fill level.

The oscillatory structure includes an essentially cylindrical housing 1, which is closed off flush at the front by a circular membrane 3. A thread 5 is formed on the housing 1, so that the device can be screwed into a container opening (not shown) arranged at the height of the predetermined fill level. Other techniques of securement known to those skilled in the art, e.g. flanges formed on the housing 1, can likewise be used.

Two oscillation bars 7, likewise part of the oscillatory structure, are formed on the membrane 3 outside of the housing 1 pointing into the container. These are made to oscillate perpendicular to their longitudinal axes by an electromechanical transducer 9 arranged on membrane 3 inside of the housing 1. The electromechanical transducer 9 in this embodiment is a disk-shaped piezoelectric element, which is situated on the membrane 3 and fixedly connected therewith. The piezoelectric element is e.g. glued, soldered or brazed on the membrane 3 and causes the membrane to undergo bending oscillations when operating. This bending motion in turn causes the oscillation bars 7 to oscillate perpendicularly to their long axes. On their membrane-far ends, these oscillation bars 7 each have a paddle 8, which is formed by a wider end section of the oscillation bars 7.

The oscillatory structure when operating is excited to oscillate with resonance oscillations by an electronic circuit 11, and a receiver-and evaluation-unit 13 is provided for determining from a resonance frequency of the resonance oscillations whether the predetermined fill level has been reached, or not. This happens, for example, by the arrangement on a membrane-far side of the piezoelectric element 9 of a transmitting electrode 15 and a receiving electrode 17.

The electronic circuit 11 places on the transmitting electrode 15 an electrical transmitting signal, which excites the mechanical oscillatory structure to oscillate. The oscillations are received by the receiving electrode 17 and changed into an electrical received signal. The receiver- and evaluation-unit 13 receives the received signal and compares its frequency with a reference frequency. It produces an output signal which indicates that the mechanical oscillatory structure is covered by a fill material, when the frequency has a value smaller than the reference frequency, and that it is not covered, when the value is larger. In the electrical circuit 11, a control circuit is provided, which regulates a phase difference between the electrical transmitting signal and the electrical received signal to a determined, constant value, at which the oscillatory structure executes oscillations with a resonance frequency.

The control circuit is e.g. constructed such that the received signal is amplified and fed back through a phase shifter onto the transmitting signal.

According to the invention, a shape of the oscillatory structure is constructed such that the resonance frequency changes only slowly during immersion in the region of the predetermined fill level. This is made possible, for example, by choosing a shape in which a center of gravity of the parts of the oscillatory structure that are immersible in the fill material in the case of projection of the oscillatory structure from above into the container is located noticeably above an end of the oscillatory structure first immersing in the liquid in the case of rising fill level.

Figure 2:
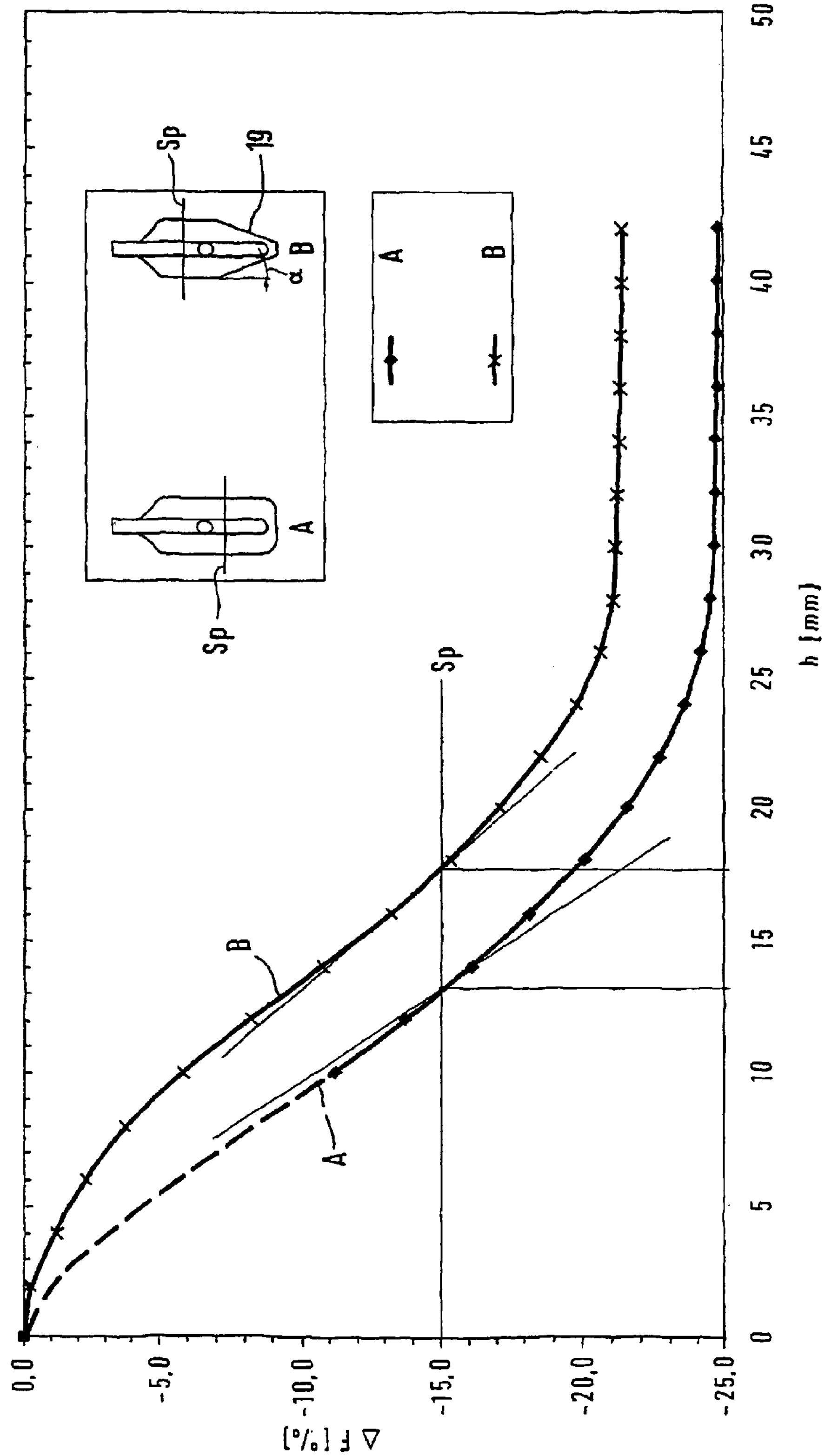
FIG. 2 shows a percentage change of frequency with which the oscillatory structure oscillates as a function of its immersion depth in the liquid for a comparison of two different paddle shapes installed from above in the container.

FIG. 2 shows an example of this using a graph of percentage change of resonance frequency $\Delta F$ of two oscillation, or tuning, fork shapes projecting from above into the container as a function of immersion depth h of the oscillatory structure into the liquid. Percentage change of resonance frequency $\Delta F$ means here the difference between the actual resonance frequency and the resonance frequency that the oscillatory structure exhibits in air, referenced to the resonance frequency in air. The first oscillation fork shape has a conventional paddle shape A, as shown to the left in the larger box in FIG. 2, with an essentially rectangular paddle area.

The second oscillation fork has a paddle shape B constructed according to the invention. This shape is likewise shown in FIG. 2, to the right in the larger box. The second oscillation fork exhibits a membrane-far end region 19, whose width decreases in the membrane-far direction. Preferably, the paddles 8 are slanted toward the longitudinal paddle axes at an angle $\alpha$ between 20° and 55°. The angle $\alpha$ is shown in the drawing. The paddle ends with a point.

While, for conventional devices using essentially rectangular paddles, when the fill material reaches the membrane-far end of the paddle, the maximum width of the paddle is immediately oscillating in the liquid and a correspondingly large volume of liquid moves with it, for the described paddle form B only a narrow paddle tip reaches into the liquid at the beginning of the immersion process. Thus, for equal immersion depths h a very much lower percentage frequency change initially happens with the paddle 8 of the invention. The illustrated characteristic curve B is, consequently, flatter than curve A for a conventional device with paddles of rectangular elevation.

If one sets a switching point Sp e.g. at a percentage frequency change of 15%, the conventional device with the paddle shape A switches already at an immersion depth of about 13 mm, while the device of the invention with the paddle form B switches only after reaching an immersion depth of about 18 mm. The curve for the percentage frequency change $\Delta F$ is noticeably flatter for the paddle shape B in the region of the predetermined fill level, thus in the environment of the switching point Sp, than it is for paddle shape A. This is illustrated by the tangents which have been drawn in. The immersion depth h reached at switching point Sp is additionally also drawn directly on the pictures of the paddle shapes A and B.

The switching point Sp lies, of course, always in the area of the paddle, but it lies closer to the free end in the case of paddle shape A than in the case of paddle shape B.

The switching point Sp can also be moved farther from the free end of the paddle by choosing a greater associated percentage frequency change $\Delta F$. This is, however, only possible within very narrow limits. The associated frequency change must be as large as possible, in order to provide a high measurement reliability; it must, however, still be attained in a multiplicity of different liquids.

Investigations have shown that the sensitivity of the device, thus the maximum change of the resonance frequency in a defined medium referenced to the resonance frequency in air, depends essentially on the width of the paddle, not, however, on its length. This relates, among other things, to the fact that a longer oscillation bar, at equal width, exhibits a noticeably greater mass moment of inertia. The end region of the paddle 8 can, consequently, be narrower, without there resulting too great of a penalty in the sensitivity of response of the device, so long as the paddles exhibit, at least in a central region, a sufficient width. Consequently, even predetermined fill levels of liquids with very low density can be flawlessly detected.

In the case of a flat curve, such as is illustrated in FIG. 2 in connection with paddle shape B, small fill level changes, such as can occur e.g. due to surface waves in the container, remain without large effect on the resonance frequency. Correspondingly, they lead less often to exceeding or falling below the reference frequency and so to a triggering of a switching process. Moreover, the related small resonance frequency changes are completely eliminated by the installation of a hysteresis stage of small height.

The hysteresis stage can e.g. be designed such that the device establishes the reaching of the predetermined fill level, when a lower reference frequency value is exceeded and it holds this state until an upper reference frequency value is reached, or exceeded. Due to the above-described, flat curve of the device, the upper and the lower frequency values can lie relatively close to one another. In this way, it is possible to prevent a switching back and forth because of surface waves, without affecting the sensitivity of response and the reliability of the device in establishing and/or monitoring the predetermined fill level.

An additional advantage of the described paddle shape lies in the fact that it exhibits a smaller mass moment of inertia, and a smaller amount of liquid moving with the paddles during oscillation of the oscillation bars in the liquid perpendicularly to their longitudinal axes, than is the case for conventional paddles with rectangular paddle areas. In this way, it is achieved, that a reaction time needed by the device to recognize a change of state is smaller. A "change of state" means here exceeding or falling under the predetermined fill level.

Above it has been assumed that the device is arranged above the container and the paddles are extended into the container. This manner of installation is e.g. provided when the predetermined fill level is a maximum fill level. Alternatively, the device can, of course, be arranged also below the container, with the oscillation bars extending upwards into the container.

Figure 3:
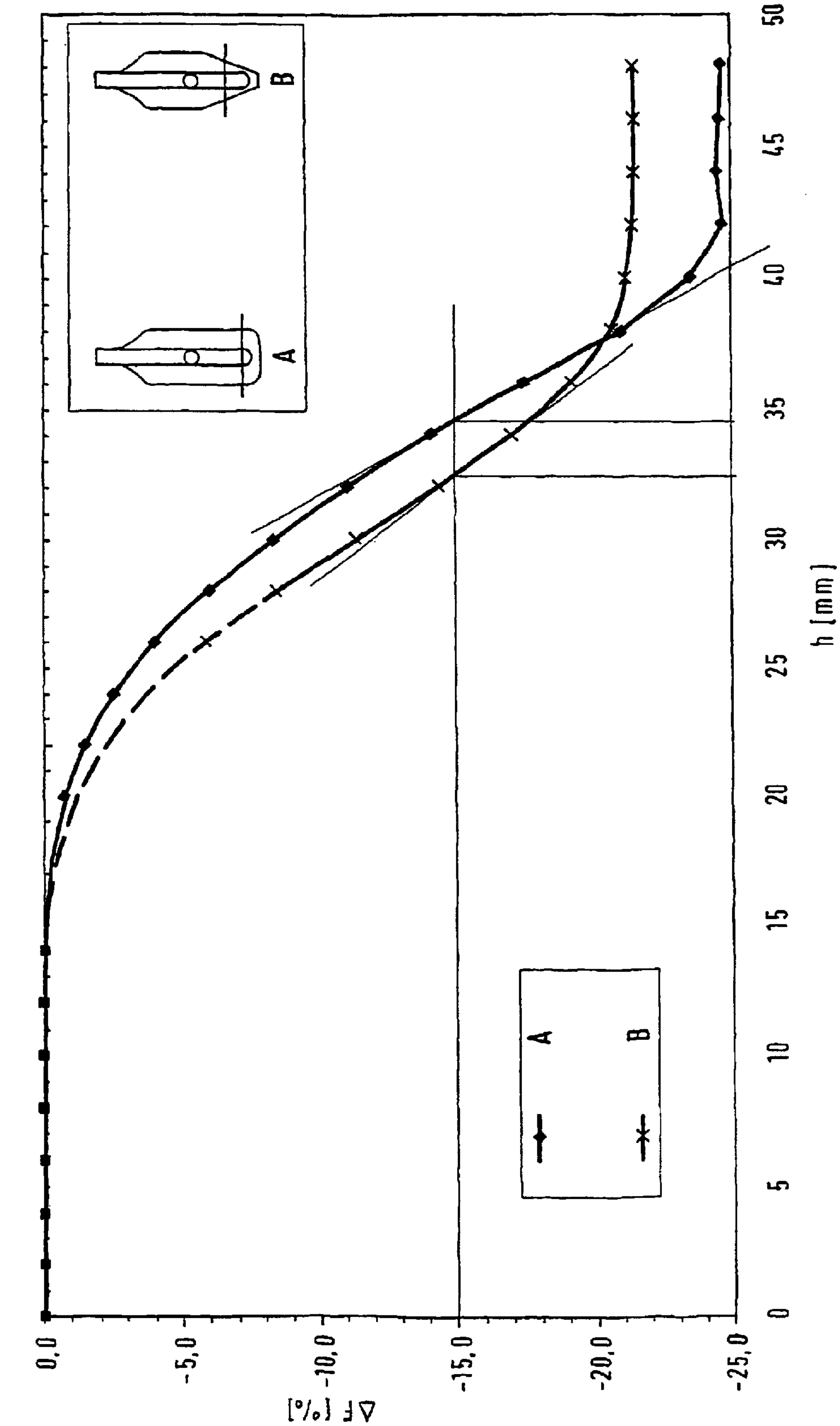
FIG. 3 shows a percentage change of frequency with which the oscillatory structure oscillates as a function of its immersion depth in the liquid for a comparison of two different paddle shapes installed from below in the container.

FIG. 3 shows the dependence of percentage frequency change ΔF for devices with the paddle shapes A and B on immersion depth in the case of oscillation bars protruding into the container from below. The liquid rises now in the case of rising fill level from the membrane 3 to the oscillation bars 7 and up to the paddles 8.

If one uses here again the predetermined switching point Sp at a frequency change ΔF of 15%, then the switch point Sp for the shape A lies very close to the free end of the paddle. The tangent as drawn shows that the percentage frequency change ΔF is falling very steeply here. This is, as discussed above, very problematic when surface waves are present. In contrast, for the case of the paddle shape B of the present invention, the switching point Sp lies farther away from the free end of the paddle and the tangent is much flatter.

The discussion of the hysteresis stage and reaction time for FIG. 2 equally applies to the situation in FIG. 3.

A device, which uses paddle shape B, operates much more stably and reliably in the presence of surface waves. A special advantage is that this is independent of whether the device is installed in the container from above or from below.

A slow change of the percentage frequency change ΔF with immersion depth is realizable, in that a projected surface of separate paddle sections of equal length moved through the fill material in operation is maximum in a middle section of the paddle and decreases in the direction toward the free end of the paddle. Preferably the paddles terminate, consequently, in a point at their free end.

Figure 4:
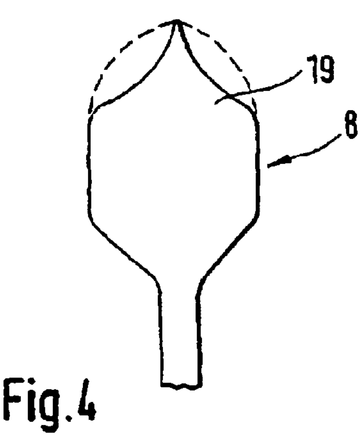
FIG. 4 shows an oscillation bar with a leaf-shaped paddle.
Figure 5:
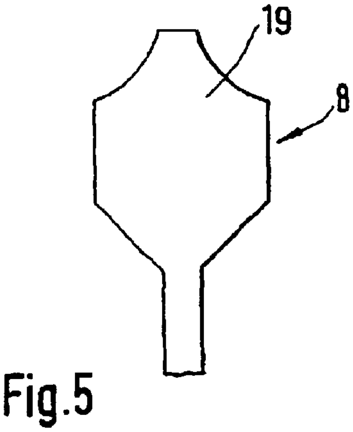
FIG. 5 shows an oscillation bar having a narrow, truncated terminus.

FIGS. 4 and 5 show further examples of possible paddle shapes. The paddle presented in FIG. 4 exhibits a point. In the case of the shape shown by the continuous line, the lateral lines of the section at the point are slightly curved toward the middle of the paddle. In the case of the embodiment shown by the dashed line, the lateral lines are slightly curved from the paddle middle towards the outside. In both cases, however, a noticeable point is present and the width of the paddle decreases in moving towards the free end. A paddle shape which is basically rectangular with rounded corners is not suitable for achieving the named advantages. Equally inadequate therefor is a slight tapering of the paddle over its entire length.

In the embodiment of FIG. 5, the lateral lines of the paddle tip are slightly curved inwards toward the middle of the paddle, but the paddle does not terminate in a pointed end. Instead, it has, relative to the maximum paddle width, a narrow, truncated terminus. Even this truncated terminus functions as a point, on the basis of its small width.

An additional advantage of the illustrated paddle shapes of the invention lies in the fact that highly viscous, thick or even sticky liquids flow from the paddle point more easily and quickly than is the case with a paddle of rectangular cross section. Liquid clinging to a paddle causes an increase of the mass moment of inertia of the oscillation bars 7 and leads, consequently, likewise to a reduction of the resonance frequency. This can, depending on the liquid, lead to the device's indicating a reaching or exceeding of the predetermined fill level, although the fill level has really already fallen below such. A fast draining of the liquid from the oscillation forks 7 means that the device recognizes more quickly when the oscillatory structure is no longer immersed in the fill material.

A further advantage resides in that the described paddle shapes have a smaller surface area than conventional paddles of rectangular cross section. Consequently, surface, on which e.g. drying liquid can find hold, is small. Thus, accumulations lead to a permanent change in resonance frequency and have a negative effect on the response sensitivity of the device.

The invention is, however, not limited to mechanical oscillatory systems with two oscillation bars; it can also be used for limit switches, which exhibit only one, or no, oscillation bar. Essential is that the shape of the oscillatory structure is so designed that the resonance frequency changes only slowly with immersion depth at the beginning of an immersion process. Such a flat characteristic curve is obtained in the case of oscillatory structures with a flat element which immerse in the liquid upon reaching or exceeding the predetermined fill level, when the surface center of gravity and the associated mass center of gravity lie in a membrane- or container wall-near half of the flat element. This is the case for oscillation bars with paddles, when a projected surface of separate paddle sections of equal length moved through the fill material in operation is maximum in a middle section of the paddle and decreases in the direction toward the free end of the paddle.

What is claimed is:

1. A device for establishing and/or monitoring a predetermined fill level in a container, comprising:

a mechanical oscillatory structure mounted to the container at the height of the predetermined fill level, said mechanical oscillatory structure has at least one membrane-mounted oscillation bar, which in operation executes resonance oscillations perpendicular to its longitudinal axis;

an electromechanical transducer associate with and adapted to excite said mechanical oscillatory structure to oscillate with resonant oscillations; and a receiver and evaluation unit connected to said electromechanical transducer, which uses a resonance frequency of said resonance oscillations to determine whether the predetermined fill level has been reached, or not, wherein:

each membrane-mounted oscillation bar has a paddle formed at its terminal end away from said electromechanical transducer, the width of said paddle is maximum in a middle section and decreases in the direction toward its free end, and said paddle is slanted in its end region at an angle $\alpha$ between 20° and 55° to the longitudinal axis of the paddle such that the resonance frequency changes slowly with the immersion depth.

2. The device as defined in claim 1, wherein:

said paddle terminates in a point.

3. The device as defined in claim 1, wherein:

a hysteresis stage is defined, which is formed such that the device establishes the predetermined fill level when a lower reference frequency value is not reached, and retains this state until an upper reference frequency value is reached or exceeded.

* * * * *